United States Patent

[11] 3,601,487

| [72] | Inventors | John S. Burton<br>Los Angeles;<br>Harry F. Rayfield, Bradbury, both of, Calif. |
|---|---|---|
| [21] | Appl. No. | 14,422 |
| [22] | Filed | Feb. 26, 1970 |
| [45] | Patented | Aug. 24, 1971 |
| [73] | Assignee | Terminal Data Corporation<br>Van Nuys, Calif. |

[54] MICROFICHE STEP AND REPEAT CAMERA
14 Claims, 5 Drawing Figs.

[52] U.S. Cl. ................................................ 355/53,
95/4.5, 355/95
[51] Int. Cl. ...................................................... G03b 27/42
[50] Field of Search ............................................. 355/41, 53,
54, 86, 95, 96; 353/25, 27; 226/19, 20; 116/124.1

[56] References Cited
UNITED STATES PATENTS

| 2,556,875 | 6/1951 | Hallstrand et al. | 116/124.1 |
| 3,077,824 | 2/1963 | Hutchins | 355/86 X |
| 3,458,253 | 7/1969 | Hansen | 355/86 X |

*Primary Examiner*—Samuel S. Matthews
*Assistant Examiner*—M. L. Gellner
*Attorney*—Harry R. Lubcke ABSTRACT: A microfiche camera suited to expose a wide selection of film widths at relatively high speeds and with required precision. The objective lens is stationary and the film is moved transversely to accomplish the multiple independent exposures characteristic of the fiche format. A photoelectric cell-format disk assembly accurately controls the lateral position of the film by coaction with a servomotor. A mechanical cable wound around a power drum translates a film-carrying carriage. The cable is kept taut by a torsion spring surrounding the hub of the drum. A stepper-motor supported by the film carriage translates the film longitudinally. A pinch roller system having spring flanges at the edges maintains precise transverse alignment at the lens aperture gate despite intervening transverse motion of the film.

PATENTED AUG24 1971    3,601,487

INVENTORS
JOHN S. BURTON
BY HARRY F. RAYFIELD

Harry R. Lubcke
AGENT

INVENTORS
JOHN S. BURTON
HARRY F. RAYFIELD
BY
Harry R. Lubcke
AGENT

INVENTORS
JOHN S. BURTON
HARRY F. RAYFIELD
BY
*Harry R. Lubcke*
AGENT

MICROFICHE STEP AND REPEAT CAMERA

BACKGROUND OF THE INVENTION

This invention pertains to precision photographic cameras in which a multiplicity of exposures are made on a given section of film by moving the film with respect to the lens between successive exposures.

The art has heretofore produced microfiche photographic records by either photographing the documents to be recorded on an individual basis, by moving the objective lens of the recording camera with respect to a stationary fiche film, by moving the whole of the film within the camera, or by moving one cut sheet of film on a vacuum platen.

These former arrangements are very slow. The lens-moving arrangement requires a nonlinear motion of the objective lens to obtain linear displacements of the image on the film. Compensation for this basic phenomenon requires a cam-actuated structure which is effective for only one degree of magnification unless the cam is changed accordingly. Moreover, off-axis images from the lens, as at the edges and corners of the fiche film, do not provide satisfactory resolution for the microimaging technique necessarily employed.

SUMMARY OF THE INVENTION

The multiple-image exposure microfiche format is obtained with a stationary objective lens and means to accurately position the film as required. The film is moved horizontally by a carriage, which is positioned by a cable under tension driven by a format-disk-controlled servomotor. A resilient tensioning means is friction damped by the wrap of the cable upon a pulley to prevent mechanical oscillations.

The film is moved vertically by a stepper motor that is carried upon the carriage. Film loops between magazines and carriage allow motion of the carriage. Mutually spring-loaded pinch rollers, which have a spring-loaded flange and are supported upon the carriage, act upon the film in a curved configuration to retain positional accuracy and precision of drive movement.

The particular fiche format is determined by a corresponding format disk, which sets the row positions while a digital counting means sets the column positions and margins. The microfilm format may selectively vary from single frames in strip form on 16 mm. film to many entries on an 105 mm. wide film as is usually used in fiche formats. The camera is capable of operating as fast as the output rate from present-day computers and so constitutes an efficient output device. It gives a microfilm record directly, in either strip or fiche form, at computer output buffer speeds of operation.

DETAILED DESCRIPTION OF THE INVENTION

While the microfiche camera of this invention is capable of unitary operation, it is typically used in conjunction with a computer as a data output device which records data directly upon microfilm records. Accordingly, in FIG. 1 the connections to computer instrumentalities are set forth to indicate the nominal interaction therebetween. This may include an intermediate computer record in the form of a magnetic tape.

In unitary operation documents themselves are photographed in any of the microfilm formats. This camera can be used with document-handling devices at speeds up to 15 documents per second by utilizing the same type of control used for operation with a computer.

Figure 1:
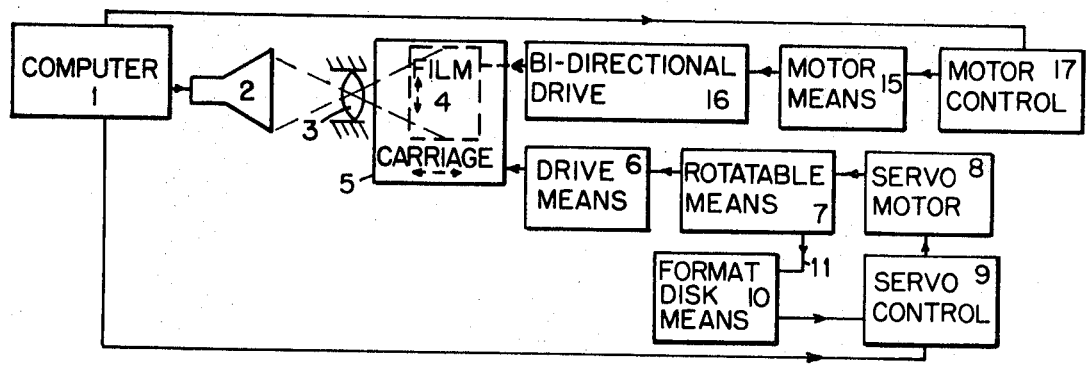
FIG. 1 is a block diagram including mechanical and electrical elements which comprise the microfiche camera of this invention and those which also regularly coact with it in normal use.

In FIG. 1 block 1 signifies a computer that produces an output that is preferably displayed over an area. This may be alpha-numeric information collated by the page, or it may be graphical information. A typical output element of the computer is cathode-ray tube 2. This may be a character-shaped beam tube, such as the Charactron. The radiant energy representation on the screen of the cathode-ray tube, usually visual, is formed by stationary lens 3 into an image upon film 4. The film is carried by a movable carriage 5, which, as normally oriented, moves horizontally. The film moves vertically with respect to the carriage. Thus, multiple exposures of a single large film can be made according to the known fiche format. The roll of film, for recording a number of fiches in longitudinal sequence, progresses vertically (normally downward) to complete placement for one column to be written by successive horizontal movements of the carriage, further vertically to be in position for the next column, and so on.

Thus, the image upon cathode-ray tube 2 is normally "lying on its side," so that each fiche may contain columns and rows of pages of information. The motion of film 4 with respect to carriage 5 arranges for the several columns, while the motion of the carriage horizontally arranges the several pages of documents in vertical sequence in each column. After one column is completed the carriage moves back to start the next column. In other words, the completed fiche is subsequently read by rotating it 90° from the position it occupies in the camera.

The carriage is translated by drive means 6. This is typically comprised of a flexible mechanical cable and suitable means for attaching the same to the carriage. Rotatable means 7 is similarly a pulley, around which the cable is wrapped somewhat more than one turn. The rotatable means is driven by some type of prime mover, such as an electric or a hydraulic motor. Direct current servomotor 8 is particularly suited for actuating this camera at relatively high speeds and with the precision required in microfilm and microfiche recording. A mechanical connection between elements 7 and 8 is provided.

A servomotor requires closed loop control. Thus, servocontrol 9 is electrically connected to servomotor 8 for an electric motor and by fluid-carrying tubing for a hydraulic motor. Herein, mechanical control as to the angular position of rotatable means 7 is supplied to servocontrol 9 by format disk means 10. The format disk rotates synchronously with the rotatable means via mechanical connection 11. The angular position the format disk occupies at any time is determined, as by apertures therein through which light is passed to photosensitive cells. The resulting electrical output is conveyed to servocontrol 9 and constitutes the principal control upon the servomotor. The indicated electrical connection from computer 1 to control 9 exercises principally ministerial control, allowing the servomotor to operate at such times as an output from the computer is being exhibited, when this is being changed to the next page to be exhibited upon cathode-ray tube 2, and similar permissive commands.

Motor means 15 acts longitudinally on the continuous strip of film 4, typically moving it from one completed column on a fiche to the position for recording the next column. The requirements of this invention are met by employing a small electrical stepper motor for this motor means. This motor is connected to film 4 by bidirectional drive 16, which typically includes a positive belt drive and a pair of overriding clutches, one clutch associated with an upper flanged film roller and the other associated with a lower flanged film roller. This structure allows longitudinal motion of the film, either forward or backward, such as is often desired to expose the title information along the top of a fiche and then to return to start the exposures for the first column thereof. Thus, in FIG. 1, the bidirectional drive is shown mechanically connected between motor means 15 and film 4 (as supported by carriage 5).

In the same general manner that a control was employed for the servomotor 8, motor control 17 controls motor means 15. Motor control 17, in turn, is given electrical commands from computer 1; typically, as to step from one column to the next in positioning the fiche film. In instances where original documents are copied, computer 1 is simplified to appropriate logic circuits to command controls 9 and 17 only.

Figure 2:
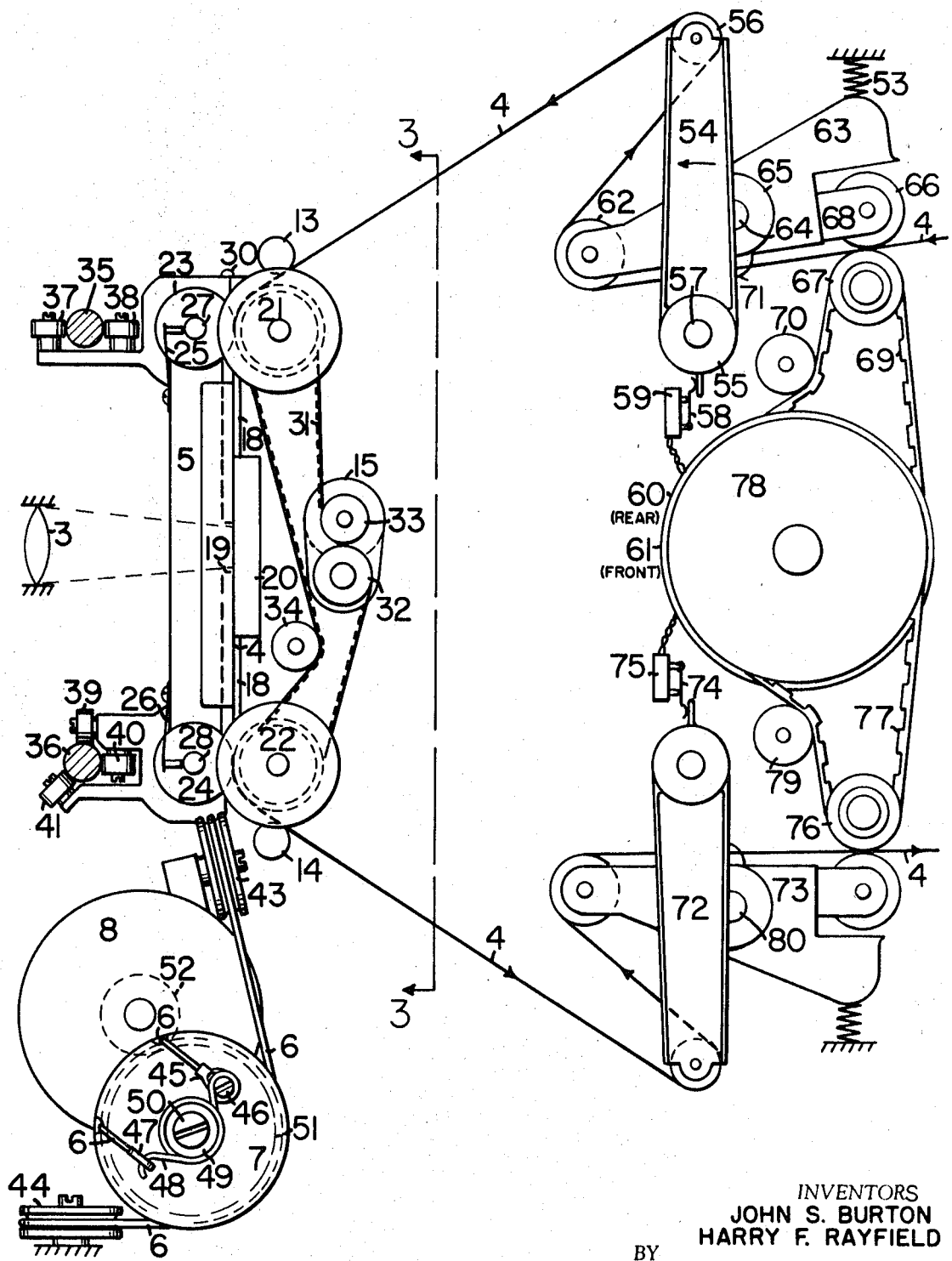
FIG. 2 is a side elevation of the mechanism of the camera.

The showing in FIG. 2 of the side elevation of the mechanism of the camera omits the enclosing case and conventional supports thereto for sake of clarity.

Lens 3 is stationary, through it may be interchangeable, this is represented by the sectioned surround, indicating attachment to the camera case. An image of the subject matter to be microfilmed is formed on film 4 at its position in front of vacuum platen 20. This platen is attached to carriage 5 and is provided with conventional vacuum connections, (not shown).

Upper metering roller 21, with a resiliently loaded flange, is attached to carriage 5 at the top thereof and typically receives incoming film 4 to be exposed at the vacuum platen. Similarly, lower metering roller 22, also with a resiliently loaded flange, is attached to the bottom of the carriage and passes on the exposed film. Fundamentally, the film could travel in the opposite direction, if there were any reason for such a modification. Film 4 is held in contact with upper metering roller 21 by upper pressure roller 23, and in contact with lower metering roller 22 by lower pressure roller 24. This pressure is provided by upper leaf spring assembly 25, which is fastened to carriage 5 and bears upon shaft 27 of upper pressure roller 23. An equivalent structure involving lower leaf spring assembly 26 bears upon shaft 28 of the lower pressure roller. Shafts 27 and 28 have play horizontally in their bearings in carriage 5 so that the respective pressure rollers do press upon film 4.

A film roller 13 is disposed above and with small clearance to flanged metering roller 21. This is to maintain the upper loop of film 4 such as to allow transverse motion of the carriage without dislocating the film. A similar roller 14 serves the same purpose in relation to flanged metering roller 22.

Carriage 5 is bisected vertically at the plane of film 4 and is fastened together by vertically disposed hinge 30 at the rear of FIG. 2 and by a known latch (not shown) at the front of that figure. This construction allows loading film 4 into the carriage.

Stepper motor means 15 synchronously drives metering rollers 21 and 22, typically by means of belt 31, of the flat fabric-toothed form. This belt is engaged by stepper motor pulley 32, in cooperation with stepper motor idler pulley 33. Belt 31 passes upward and translates upward in normal forward-advancing film operation and around the upper metering roller at a smaller diameter than the diameter which supports film 4. In this manner it does not interfere with the film, through the two entities pass over the same metering roller as a whole.

Subsequently, belt 31 passes downward to forward idler pulley 34. This idler is so positioned that more than a half-circumference wrap of the belt is obtained around both rollers 21 and 22. This wrap is greater at lower roller 22, where the general vertical course of the belt would cause it to hang ineffectively in case of insufficient tension. After wrapping around lower roller 22 the belt continues back to motor pulley 32. The belt is continuous and preferably is without a joint.

Stepper motor 15 rotates incrementally in response to a pulse of electricity from motor control 17. In a typical embodiment each resulting increment of motion of film 4 has been 0.010 inch. Control 17 is thus programmed from computer 1 with a sufficient number of pulses to provide the desired column to column spacing in the microfiche format. These occur at the time the column change is to be made. Control 17 either amplifies computer-originated pulses sufficiently to provide power for motor 15, or generates power pulses when so controlled by starting and stopping control pulses from the computer.

(It will be remembered that the columns of the fiche lie horizontally when film is in the camera, thus, motion of the film vertically gives column to column spacing.)

Motion of the fiche to provide exposures down each column is provided by translation of carriage 5, in a direction perpendicular to the plane of the paper of FIG. 2. Upper rod 35 provides one support for such translation, while lower rod 36 provides another. Both rods are attached to the stationary case of the camera (not shown).

Carriage 5 has an extension arm and a pair of upper rollers 37 and 38, which engage each side of rod 35. The rollers are equipped with ball bearings and the rod is accurately aligned so that friction is reduced to a minimum. The same general construction is employed for lower rollers 39, 40 and 41. However, these rollers are disposed vertically, horizontally, and at an angle of 45°, respectively. This is necessary so that carriage 5 will be positively attached to lower rod 36 and thus to the case of the camera. This prevents loss of tracking should the camera be subjected to various orientations in space while being transported, and also ensures that precise positioning of film 4 with respect to the image from lens 3 will always be obtained.

Translation of the carriage is effected by means of mechanical cable 6, which is ultimately driven by servomotor 8. Cable 6 is attached to the bottom of carriage 5. Grooved pulley 43 is supported to the camera case at essentially that elevation. An identical additional pulley 94 is similarly supported at the other side of the case. See FIG. 3. Thus, cable 6 translates as required between these two pulleys, with the carriage attached to the cable between them.

Figure 3:
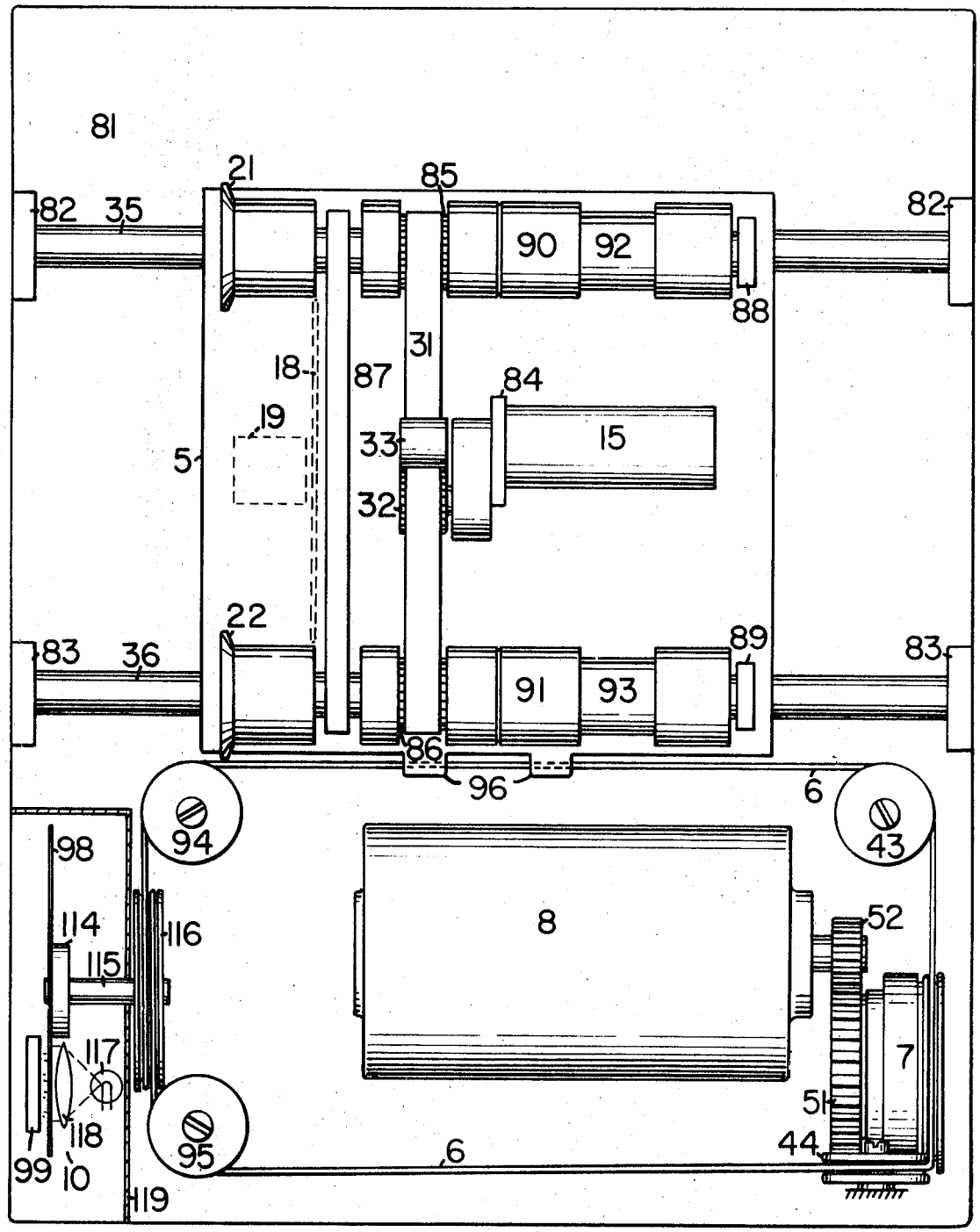
FIG. 3 is an elevation of the mechanism of the camera, taken along line 3—3 of FIG. 2.

Rotatable means 7 takes the form of a large grooved pulley, and each end of cable 6 terminates thereupon. The continuous arrangement of the remainder of the run of cable 6 is leftward from means 7 over horizontally disposed pulley 44, which is also supported by the enclosing case of the camera. Cable 6 extends to the rear at the left of pulley 44, and at the rear of the case passes over another pulley 95 similarly situated as pulley 44. As is seen in FIG. 3 cable 6 has a rectangular course as a whole.

That part of cable 6 extending from pulley 43 wraps around means 7 in excess of one-half turn, and by means of loop fastening 45 is attached to cable stud 46, which is fastened to means 7. Similarly, that part of cable 6 extending from pulley 44 wraps around means 7 in excess of one-half turn, and by means spring fastening is attached to torsion spring 48. This spring typically has seven convolutions loosely wrapped around hub 49 of rotatable means 7, with one end fastened to spring fastening 47 and the other end fastened to cable stud 46. Rotatable means 7 is journaled in a pair of ball bearings, which are supported upon shaft bolt 50. Bolt 50 is fastened to the enclosing camera case.

Cable 6 is typically a multistrand steel cable of relatively high flexibility to minimize friction. The configuration of spring 48 is such that a selected force within the range of 5 to 20 pounds is exerted on the cable. The friction of in excess of one turn of cable 6 in wrapping around rotatable means 7 is not excessive but is sufficient to damp out mechanical oscillations upon start and particularly upon stop of translation of carriage 5. A simple extensible spring included as part of cable 6 where it was not required to pass over any pulleys was definitely not satisfactory in this regard. The structure described is capable of positioning carriage 5 as may be desired within about 0.001 inch.

Rotatable means 7 includes gear 51 attached thereto. This meshes with motor gear 52, typically of half the diameter of gear 51, thus providing a two to one reduction of speed for means 7. Motor 8 is servo-controlled to accelerate during the first half of a period of operation and to decelerate during the second half thereof. This gives the most effective sequence from the standpoint of traveling a given distance in a minimum period of time. This is accomplished by signals originating at format disk means 10, which will be later described.

The remainder of the path of film 4 according to this invention has to do with maintaining upper and lower loops between carriage 5 and film feed and takeup mechanisms. Metering rollers 21 and 22 retain film 4 accurately in position transversely of the film by the force exerted by the flanges and appropriate fixed guide at the other side of the film. This positioning is maintained regardless of the translation of the carriage back and forth to allow recording the several entries in each column upon the typical fiche. Since the film is curved around rollers 21 and 22 and constrained by rollers 13 and 14, it is quite stiff and does not buckle under the edge restraint placed upon it.

The upper film loop is maintained by upper sensor arm 54, which has a spring-loaded hub 55 biased to urge it upward in the position in which it is shown. This results in a relatively long loop between the roller 56 thereof and upper metering roller 21, so that lateral motion of film 4 resulting from translation of carriage 5 can be accommodated. Hub 55 rotates around stationary shaft 57, which is fastened to the enclosing case. The hub has a projection which bears against the actuating are 58 of an electrical switch; i.e., upper microswitch 59, when arm 54 is in the upright position shown.

The film here is coming from a supply reel (not shown). Microswitch 59 is of the normally closed (NC) type; when actuating arm 58 is depressed the contacts are opened. These electrically connect to feed motor 60, which is the rear of two coaxially mounted motors as shown in FIG. 2. That is, they are mounted in tandem fashion, one behind the other. Takeup motor 61, having the same size and characteristics, is in front. SEnsor arm 54 is shown in its fully vertical position, as a consequence of which the upper film loop is sufficiently long. The internal contacts of switch 59 are thus opened and the feed motor stops. The reverse action takes place when film 4 has been exposed and fed farther through the camera by stepper motor 15. As this process continues arm 54 moves to the left, as indicated by the arrow upon it.

The upper loop originates at upper idler pulley 62, which is a part of upper pressure roller assembly 63. In common with all elements at the right-hand side of FIG. 2, this assembly is fastened to the enclosing case (not shown) by extensions of shaft 64. Upper pressure roller 66 resiliently presses film 4 against feed roller 67. This is accomplished by upper pressure roller assembly spring 53, disposed between upper assembly 63 and the case. This urges assembly 63 downward until a superior force exerted by an operator seeking to thread the camera lifts the assembly upward at the right side thereof.

The upper end of upper drive roller (feed roller) 67 is formed to contain a pulley suited to accept upper toothed belt 69. This belt also passes around a large pulley attached to feed motor 60, and is held in proper drive configuration by drive idler pulley 70.

Feed motor 60 is typically embodied in the slow-speed synchronous type, such as an 180 pole model having an output speed of 72 revolutions per minute (r.p.m.), sometimes known as a "Slosyn" motor. The function of this motor is to advance film 4 into the camera proper from a feed, or unexposed film magazine (not shown), but which is positioned to the right of the upper part of FIG. 2, so that incoming film enters as shown by the arrow on film 4 at the location.

A mechanism equivalent to that of the feed mechanism just described is employed for the takeup mechanism. Here, also, a relatively long loop of film 4 is required between lower metering roller 22 and the roller of lower sensor arm 72. Lower pressure roller assembly 73 is equivalent to upper assembly 63. However, lower sensor switch 75 is of the opposite type to that of upper switch 59; i.e., it is of the normally open (NO) type. Switch 75 is connected to takeup motor 61. When lower sensor arm 72 reaches the vertical position shown and lower actuating arm 74 is depressed, switch 75 is closed and motor 61 is energized. This occurs only when the lower film loop is long enough, since only then should film be moved out of the camera proper and into the takeup or exposed film magazine (not shown), but positioned to the right of the lower part of FIG. 2, so that the film leaves at the arrow there.

As with the upper (feed) elements, the lower (takeup) elements are equivalent, in that lower drive (feed) roller 76 has an upper end formed to contain a pulley suited to accept lower toothed belt 77. This belt also passes around large takeup motor pulley 78, which is attached to takeup motor 61. The belt is held in proper drive configuration by takeup idler pulley 79.

Takeup motor 61 is a slow-speed synchronous motor equivalent to feed motor 60. The takeup motor moves the exposed film 4 into a previously described takeup film magazine. Further film drive means are provided; one associated with the feed magazine and one with the takeup magazine, so that, typically, the unexposed film will be unwound and the exposed film will be wound upon film cores or reels in the magazines involved. This functioning is further treated below.

Figure 5:
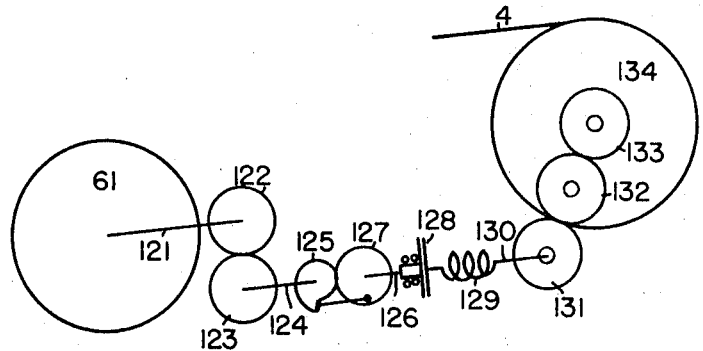
FIG. 5 is a mechanical schematic of the kinematic train for driving the supply and takeup reels.

A particular torsional spring drive for the film spools in the upper and the lower magazines has been found to be highly desirable. Since forward and reverse motions of film 4 are required in titling the typical fiche, this drive is employed for both magazines. It is shown schematically in FIG. 5. Such a showing is used to most clearly delineate the kinematic chain. Suitable bearings and supports for the elements shown may be provided in a known manner. FIG. 5 is explained in conjunction with takeup motor 61.

Takeup motor shaft 121 carries gear 122 in addition to the drive pulley for toothed belt 77 in FIG. 2. This gear meshes with a second gear 123, which has a shaft 124. Upon this shaft is also mounted a one-way drive mechanism cam 125. Coacting therewith, but on a separate shaft 126 is ratchet assembly 127. Shaft 126 also carries slip-clutch 128, which is of the bidirectional type. The second mechanical connection of clutch 128 is connected to one end of torsion spring 129, the second end of which is connected to torsion spring shaft 130. This shaft also carrier first spool gear 131, which meshes with second spool gear 132, which meshes with third spool gear 133. The last gear is attached to magazine spool 134. This has been shown in an enlarged view in FIG. 5, as carrying a certain amount of film 4.

In operation, torsional spring 129 is used to temporarily store rotational energy. Motor 61, typically of the Slosyn type, operates best without a large inertial load. With only clutch 128 in this kinematic chain it was found that upon starting the motor the slip of the clutch was excessive. When the takeup spool was essentially empty of film this slip resulted in film 4 being loosely wound, an undesirable condition.

With the torsion spring included, motor 61 is allowed to gain synchronous speed at once; as within one cycle of alternating current of 60 cycles per second. This initial energy is stored in deformation of the torsional spring. As spool 134 comes up to speed this energy is given back by the spring returning to essentially its undeformed state. Clutch 128 is adjusted so that it slips only when bona fide tension exists in film 4, as it is fed out or drawn in, as the case may be. Since each film magazine may alternately feed or takeup, at least incrementally as the whole roll of film is exposed, a second kinematic chain according to FIG. 5 is provided in association with feed motor 60. While the showing of FIG. 5 is typical, equivalent embodiments of the drive train may be used.

FIG. 3 is an elevation of the rear of the front plate and carriage 5 of the camera mechanism. This is looking toward the left in FIG. 2 along section line 3—3. In FIG. 3 numerous elements previously described in connection with FIG. 2 are identified by the same reference numerals used in FIG. 2.

Accordingly, carriage 5 is supported by upper rod 35 and by lower rod 36. The resiliently loaded flange of upper metering roller 21 and of lower metering roller 22 are seen at the extreme left of carriage 5. Rod 35 is supported to front plate 81 by pillars 82 at each end of the rod, and rod 36 is similarly supported by pillars 83. Stepper motor means 15 is supported by support 84. Belt 31 engages stepper motor pulley 32, and may have relatively fine teeth, with corresponding gearlike pulleys to provide a positive drive. These include pulley 32 on the motor and pulley sections 85 and 86 on film-metering rollers 21 and 22. Idler roller 33 does not have a gearlike surface, but is smooth because it bears upon the back of belt 31.

Upper metering roller 21 is supported in ball bearings at common bearing support 87 and at upper bearing support 88. Similarly, lower metering roller 22 is supported by common support 87 and lower bearing support 89. These rollers are additionally provided with upper overriding clutch 90 and lower overriding clutch 91 at essentially the center of each longitudinally, respectively. Stepper motor 15 is operable in either direction so that titles may be exposed along the top of a fiche and then the film rolled back to begin the column-by-column exposure of pages of material for that fiche. It is always desirable to have the forward roller drive the film and the rear roller exert some frictional resistance. Each overriding clutch is in essence a notched cam with an accompanying spring-loaded pawl, so that motion in one direction can occur without drive, but in the opposite direction the pawl engages a notch in the cam and the drive is positive. The upper and lower metering rollers are relieved at various places, longitudinally, to allow for bearing, drive belts, and at 92 and 93, respectively, for the back film guides 18 which are attached to certain aperture plates 19 for particular widths of film.

Further in FIG. 3, servomotor 8 is mounted to front plate 81 at the lower center thereof, having gear 52 in mesh with gear 51 of pulley rotatable means 7. Between this gear and the groove which carries cable 6 there may be incorporated a friction clutch to slip if cable 6 and/or carriage 5 are restrained by some abnormality. This prevents damage. Pulleys 43 and 44 (also seen in FIG. 2) are at the right side of the structure in FIG. 3, while upper grooved pulley 94 and lower grooved pulley 95 are at the left of this structure. The four pulleys completed a rectangular configuration for cable 6. Two lower projections 96, central to carriage 5 are clamped around the cable, so that the former is accurately driven by the latter. Cable 6 may have an ultimate tensile strength of 120 pounds. The tension exerted upon it by spring 48 (FIG. 2) is a selected value within the range of 5 to 20 pounds; thus, an adequate safety factor is included.

Format disk means 10 are located at the lower left in FIG. 3 and are there shown in side elevation. Format disk 98 and photosensitive cell holder 99 are detailed later in front elevation in FIG. 4. Format disk hub 114 removable supports disk 98. The hub is fixedly attached to format disk shaft 115. This shaft has bearings supporting it to plate 81, but these have not been shown for sake of clarity. At the end of shaft 115 opposite the hub format disk pulley 116 is attached. A full turn of drive means cable 6 passes around this pulley, to the end that the angular position of disk 98 is accurately related to the position of carriage 5.

Figure 4:
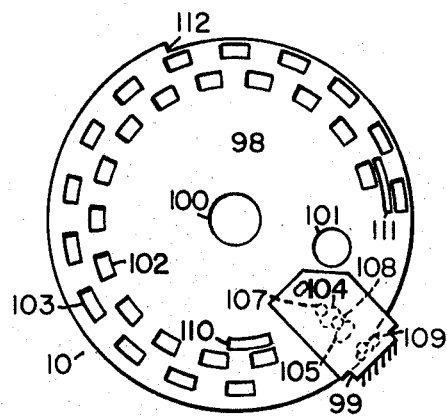
FIG. 4 is a front elevation of the format disk means employed for servocontrol of the servomotor.

Format disk lamp 117 and format disk lens 118 form a collimated beam of light that passes through the apertures of disk 98. The apertures are best seen in FIG. 4. Format disk light shield 119 forms a separate compartment for format disk means 10, so that illumination from lamp 117 will not enter the main camera case and thus spuriously expose film 4.

FUrther as to FIG. 4, disk 98 is accurately formed with a central hole 100 to fit over hub 114 (FIG. 3) and with a circumferential indexing aperture 101 spaced from hole 100. The aperture 101 fits over a projection associated with hub 114.

The number of active apertures in each format disk 98 depends upon the number of rows of information that are to be entered on the microfiche. In a known COM microfiche format this is 14. (Sixteen columns are also used, providing 224 frames of information upon one fiche.) In FIG. 4 there are 14 pairs of staggered apertures. Inner apertures 102 and outer apertures 103 are evenly spaced around approximately 280° of the circumference of disk 98. The circumferential extent is set by the required distance carriage 5 is to move. This always corresponds to less than one revolution of disk 98, so also with respect to rotatable means pulley 7.

Inner photovoltaic cell 104 is radially aligned with inner apertures 102 and is supported by cell holder 99. Outer photovoltaic cell 105 is radially aligned with outer apertures 103 and is similarly supported. Lamp 117 and lens 118 provide illumination, these elements being shown in FIG. 3 but omitted from FIG. 4 for sake of clarity.

The stopping point for each row on the fiche is determined by the circumferential juxtaposition of an adjacent aperture on row 102 with one on row 103. When this position is taken by disk 98 with respect to the centerlines of cells 104 and 105, incremental revolution by the disk decreases the effective area of one aperture, say of the outer row, and increases the effective area of the companion aperture of the inner row.

Photovoltaic cells 104 and 105 are proportional analog devices. That is, the magnitude of the electrical output from each is proportional to the amount of light falling on each; the intensity of the light source remaining constant, of course, in this application. When the radial line between an adjacent pair of apertures is centered with respect to the centerline of the photovoltaic cells, the output from each cell is the same. The "radial line" and the "centerline" do not really exist on the disk or the cells, but these are used for purposes of description. Incremental revolution of the disk will increase the electrical output from one cell and decrease it from the other. The electrical servosystem accepts these outputs and stops servomotor 8 when they are equal. It has been found that the accuracy of positioning carriage 5 in accordance with this control is 0.002 inch, which degree of accuracy is desirable in producing fiches.

The positioning of the disk with respect to the photovoltaic cells set forth above is the "true" position; such as at the upper side of an aperture 102 or at the lower side of an aperture 103 as interpreted at the left side of the disk as shown in FIG. 4. That is, every true position is every other radial line apart. In between is what has been termed a "false" position; i.e., at the lower end of an aperture 102 and the upper end of an aperture 103. The false position merely gives a voltage variation with circumferential motion that is 180° out of phase with respect to the true position, since the aperture positions with respect to the photocells are reversed. While the "true" position is a command to "stop" the servomotor 8, the "false" position is a command to "decelerate" the same. Since the "false" position is halfway between "true" stop positions the motor is accelerated for the first half of any excursion and decelerated during the second half of any excursion.

Cell holder 99 also supports three phototransistors; 107 having to do with establishing the "home" position of disk 98, 108 the "end" position, and 109 the "halfway" position in the matter of retrace of the carriage. These photo elements are employed in the digital response mode, the signal used are of either "on" or "off" amplitude. auxiliary apertures on disk 98 coact optically with these photo elements; "home" position aperture 110 being at an inner radius, "end" position aperture 111 being at an intermediate radius between the radii of apertures 102 and 103, and the "halfway" retrace position aperture 112 being at the outer circumference of disk 98 and comprising a reduction of the outer diameter for approximately half of the circumference, clockwise.

The electrical signals generated by the "home" and the "end" apertures are necessary to terminate revolution of disk 98 by the servosystem. Otherwise, each set of apertures is the same as any other set, and notification of the completion of a complete traverse by carriage 5 would not be given to the servosystem.

A performance similar to that obtained between each pair of apertures 102 and 103, as has been described, is obtained as to acceleration and deceleration on the retrace (or return to starting position) of disk 98. The "halfway" index to the servosystem is provided by aperture 112. At the start of the retrace, servocontrol 9 (FIG. 1) causes servomotor 8 to accelerate at full speed; this being instigated by end position aperture 111 passing illumination to phototransistor 108. When halfway aperture 112 occults phototransistor 109 upon the return excursion, servocontrol 9 terminates the acceleration epoch and applies the deceleration epoch, as by removing the accelerating voltage and applying a voltage of reverse polarity to servomotor 8. The latter, being a bidirectional motor, tends to revolve in the opposite direction, but in view of the accelerated speed in the original direction merely acts to bring the motor to a stop as rapidly as possible.

For purposes of this application, servocontrol contains logic circuits to accept the commands that have been set forth and give control of electrical energy to accelerate, decelerate, or stop servomotor 8.

Several widths of roll film may be selectively used in the camera. The 16-mm. and 35-mm.-wide films are exposed in strip sequence. That is, one frame after another is exposed down the strip and there is no transverse motion of the film by carriage 5. Multi-image formats, of typical fiche character include 70-mm.-wide film, and particularly 3¼-inch and 105-mm.-wide film. In these three latter widths the film contains a number of columns and a number of frames in each column, so that motion of carriage takes place to enter the several frames in each column. (The fiche is lying on its side while in the camera.)

Formats are changed by placing the appropriate aperture plate 19 in the camera (see FIG. 3) and by placing the corresponding format disk 98 on hub 114. The proper aperture plate has not only the proper size aperture for allowing exposure for the particular film width, but has a guide 18 to retain the film in proper track upon the plate. Each width of film is positioned so that one edge (the left as seen in FIG. 3) bears against flanged metering rollers 21 and 22. This gives lateral stability to the film. Also, such positioning places any width of film near the door of the camera (not shown) which is opened for threading the camera, thus making it equally easy to thread any width of film.

In the upper assembly 63 and lower assembly 73, each has a set of five flat fingers that may be selectively elevated by cam protrusions on shafts 64 and 80, respectively. In the same way that guide 18 provided a back guide on the aperture plate these fingers provide a guide for the film as it passes through the upper and lower loop feed assemblies. A knob upon the external side of the camera case (not shown) attaches to each shaft 64 and 80, respectively, and allows selection of the desired finger guide, 71. Each such knob is typically inscribed with the film widths at the appropriate points upon its circumference, so that this adjustment can be made along with inserting the appropriate aperture plate and format disk.

A small door, separate from the film-threading door in the camera case, is provided for opening the separate compartment 119. This allows format disk 98 to be changed at any time while preventing ambient light from entering the camera proper. Thus, a format may be changed without changing the width of film within the camera.

It is thus seen that a multiformat microfiche camera has been provided, which in addition has a mechanical accuracy, optical quality and speed of operation that has not been possible heretofore.

We claim:
1. A microfiche camera comprising;
 a. a stationary objective lens (3),
 b. a movable carriage (5),
  carrying film (4) to be exposed,
 c. rotatable format means (10), having spaced indicia (102-3) corresponding to a selected fiche format,
 d. a servomotor (8), connected to said rotatable format means for servo position control thereby,
 e. drive means (6) attached to said carriage,
 f. rotatable means (7), connected to said servomotor and to said drive means (6) by resilient means (48) dynamically a damped by said rotatable means and said drive means, and
 g. motor means (15) upon said carriage, disposed to move said film (4) with respect to said carriage.
2. The camera of claim 1, in which said rotatable format means (10) is comprised of;
 a. a multiapertured disk (98),
 b. means (116) to rotate said disk by said drive means (6),
 c. means (117-8) to direct radiant energy toward the apertures of said disk, and
 d. plural radiant-energy-sensitive means (104-5 and 107-9) disposed to receive said radiant energy and produce an electrical signal therefrom.
3. The camera of claim 2, in which;
 a. said plural radiant-energy-sensitive means (104-5) having to do with forward rotation of said rotatable format means (10) give an analog electrical output proportional to the magnitude of energy falling upon them, and
 b. said plural radiant-energy-sensitive means (107-9) having to do with return rotation of said rotatable format means (10) give a digital electrical output of fixed magnitude for all appreciable magnitudes of energy falling upon them and no electrical output for less than that magnitude of energy falling upon them.
4. The camera of claim 1, in which;
 a. said drive means (6) is a flexible cable.
5. The camera of claim 1, in which;
 a. said rotatable means (7) is a pulley about which said drive means (6) is wrapped.
6. The camera of claim 1, in which;
 a. said resilient means (48) is a torsional spring disposed within said rotatable means (7) and attached to one end of said drive means (6) and to said rotatable means (7) for tensioning said drive means.
7. The camera of claim 1, in which;
 a. said motor means (15) is a stepper motor that is bidirectionally rotatable
8. The camera of claim 1, which additionally includes;
 a. resiliently loaded flange metering rollers (21-2) mounted upon said carriage for holding the length of said film (4) upon said carriage at a fixed location thereon.
9. The camera of claim 8, which additionally includes;
 a. a roller (13) located in conjunction with each said metering roller (21, 22), and
 b. a second roller (23) bearing upon each of said metering rollers (21, 22),
  to retain said film (4) in a curved configuration around each said metering roller.
10. The camera of claim 1, which additionally includes;
 a. plural aperture plates (19) selectively mountable upon said carriage (5), and
 b. a film guide (18) upon each said aperture plate positioned to retain a film of selected width in contact with the flange of said metering rollers (21, 22).
11. The camera of claim 1, in which;
 a. pairs of spaced indicia (102-3) are circumferentially disposed upon said rotatable format means (10) successively spaced,
  whereby the beginning of the first indicia provides a first aperture relation, the end of the first indicia and the beginning of the second indicia provides a second aperture relation, and the end of the second indicia provides a third aperture relation,
  for servocontrol of said servomotor (8) in acceleration and deceleration according to said aperture relations.
12. The camera of claim 1, which additionally includes;
 a. a takeup motor (61)
 b. a pivoted sensor arm (72), and
 c. means (75) responsive to the position of said sensor arm and connected to said takeup motor to maintain a loop of film between said sensor arm and the film upon said carriage (5).
13. The camera of claim 1, which additionally includes;
 a. a magazine spool (134),
 b. a takeup motor (61), and
 c. torsional drive means (129) connected
  between said takeup motor and said magazine spool
  for temporarily storing mechanical energy from said motor.
14. The camera of claim 1, which additionally includes;
 a. a film pressure roller assembly (63) contacting said film (4), and
 b. plural fingers (as 71) selectively laterally bearing upon said film for the guidance thereof.